US010072693B2

(12) United States Patent
Dimelow et al.

(10) Patent No.: US 10,072,693 B2
(45) Date of Patent: Sep. 11, 2018

(54) CASING ASSEMBLY

(71) Applicant: ROLLS-ROYCE PLC, London (GB)

(72) Inventors: Stephen Jonathan Dimelow, Uttoxeter (GB); Alison Jane McMillan, Uttoxeter (GB)

(73) Assignee: ROLLS-ROYCE plc, London (GB)

( * ) Notice: Subject to any disclaimer, the term of this patent is extended or adjusted under 35 U.S.C. 154(b) by 311 days.

(21) Appl. No.: 14/717,558

(22) Filed: May 20, 2015

(65) Prior Publication Data
US 2015/0354616 A1 Dec. 10, 2015

(30) Foreign Application Priority Data

Jun. 6, 2014 (GB) .................................. 1410058.0

(51) Int. Cl.
F16B 31/00 (2006.01)
F16B 33/00 (2006.01)
F01D 25/24 (2006.01)
F16B 5/00 (2006.01)
F16B 31/02 (2006.01)
F16B 37/04 (2006.01)
F01D 21/04 (2006.01)

(52) U.S. Cl.
CPC ............ *F16B 31/00* (2013.01); *F01D 21/045* (2013.01); *F01D 25/243* (2013.01); *F16B 5/0024* (2013.01); *F16B 31/021* (2013.01); *F16B 33/00* (2013.01); *F16B 37/047* (2013.01); *F05D 2260/311* (2013.01); *Y02T 50/672* (2013.01)

(58) Field of Classification Search
CPC .... F16B 37/047; F16B 31/021; F16B 31/024; F05D 2260/311; F05B 2260/3011; F01D 21/045; F01D 25/243

USPC .................................. 411/104, 9, 10; 451/9
See application file for complete search history.

(56) References Cited

U.S. PATENT DOCUMENTS 2,747,638 A 5/1956 Cederquist
2,903,035 A 9/1959 Davenport et al.
(Continued)

FOREIGN PATENT DOCUMENTS

EP 0651135 A2 5/1995
EP 2 538 035 A2 12/2012
GB 1455295 A 11/1976

OTHER PUBLICATIONS

Oct. 20, 2015 Extended European Search Report issued in European Patent Application No. 15168370.3.
(Continued)

*Primary Examiner* — Flemming Saether
(74) *Attorney, Agent, or Firm* — Oliff PLC

(57) ABSTRACT

A bolt which extends into the first casing part, into the hole in the barrel nut, and into the second casing part, wherein the bolt engages with the barrel nut so as to join the first casing part to the second casing part; wherein the barrel nut includes a first portion and a second portion, wherein the first portion of the barrel nut is structurally weaker than the second portion of the barrel nut such that, if a predetermined load between the first casing part and the second casing part is exceeded, the first portion of the barrel nut becomes crushed while the second portion of the barrel nut remains engaged with the bolt. The casing assembly may be included in a gas turbine engine.

12 Claims, 6 Drawing Sheets

(56) References Cited

U.S. PATENT DOCUMENTS

| | | | | |
|---|---|---|---|---|
| 3,205,927 A * | 9/1965 | Phelan | ................... | F16B 37/047 411/104 |
| 3,208,496 A * | 9/1965 | Phelan | ................... | F16B 37/047 411/104 |
| 3,322,177 A * | 5/1967 | Phelan | ................... | F16B 37/047 411/104 |
| 3,974,313 A * | 8/1976 | James | ....................... | B32B 3/28 428/176 |
| 4,886,407 A * | 12/1989 | Harbin | .................. | F16B 37/047 411/104 |
| 4,981,388 A | 1/1991 | Becken et al. | | |
| 5,171,099 A * | 12/1992 | Westre | ...................... | F16B 5/01 403/264 |
| 6,364,603 B1 * | 4/2002 | Czachor | ................ | F01D 21/045 415/200 |
| 6,428,269 B1 * | 8/2002 | Boratgis | ............... | F01D 21/045 411/2 |
| 6,663,314 B2 * | 12/2003 | Bequet | ...................... | B64C 1/12 403/408.1 |
| 7,318,685 B2 * | 1/2008 | Bouchy | ................. | F01D 21/045 403/2 |
| 8,777,509 B2 * | 7/2014 | Couffignal | ............ | F16B 5/0092 403/296 |
| 8,844,869 B2 * | 9/2014 | Andre | ....................... | B64C 1/26 244/119 |
| 9,810,096 B2 * | 11/2017 | Evans | ..................... | F01D 25/26 |
| 2009/0285652 A1 | 11/2009 | Williams | | |
| 2013/0177368 A1 | 7/2013 | Nelson et al. | | |
| 2015/0266587 A1 * | 9/2015 | Pretty | ................... | B64D 29/06 415/214.1 |

OTHER PUBLICATIONS

Aug. 12, 2014 Search Report issued in British Application No. GB1410058.0.

* cited by examiner

CASING ASSEMBLY

FIELD OF THE INVENTION

This invention relates to a casing assembly and a gas turbine engine including a casing assembly.

BACKGROUND OF THE INVENTION

In the field of gas turbine engines, the current art is to join a first casing part to a second casing part through an upturned bolted flange. As described below with reference to FIG. 2 and FIG. 3, such a joint is well suited to metallic casing parts, as the metal can easily be formed to create the flanges and the flanges are of metal that is as stiff and strong as the material of the remainder of the casing parts.

However, the present inventors have observed problems with an upturned bolted flange joint, and such problems are discussed below with reference to FIG. 2 and FIG. 3.

In particular, the present inventors have observed that bolted flange loading is also difficult with composite casing parts because the through-thickness loading onto the composite under the bolt head and nut is high. Traditionally, this issue is solved using load spreaders, for example larger and specially shaped washers.

The present invention has been devised in light of the above considerations.

Barrel nuts are a known component for attaching two parts together. Barrel nuts are disclosed, for example, in U.S. Pat. No. 2,789,457, U.S. Pat. No. 4,159,552, and U.S. Pat. No. 3,208,496. Barrel nuts are known for use in assembling flat pack furniture.

U.S. Pat. No. 4,061,073 discloses a crushable collar type bolt fastening similar to current containment flange design philosophy (discussed below with reference to FIG. 2 and FIG. 3).

EP2538035 discloses a joint assembly includes a first component with a flange containing a plurality of spaced through-holes. The joint assembly further includes a second component with a joining portion having an end surface which faces the flange. The joining portion contains a plurality of spaced elongate cavities. Each cavity extends into the joining portion from the end surface in axial alignment with a respective one of the through-holes. The joint assembly further includes a plurality of fixation devices. Each fixation device includes a bolt with a shank which extends through a respective through-hole and the corresponding aligned cavity. Each fixation device further includes a nut which is embedded within the joining portion at the corresponding cavity to threadingly receive the shank such that on tightening the nut and the bolt a clamping force is exerted across the flange and the end surface to join the first and second components together. Each fixation device is configured such that under axial loads less than those causing bolt failure the fixation device is deformable to remove the clamping force across the flange and the end surface.

SUMMARY OF THE INVENTION

In general, the present invention relates to a casing assembly in which a first casing part is joined to a second casing part by a fixation device that includes a barrel nut. As discussed above, using a barrel nut to join two casing parts together can help to address various problems associated with the upturned bolted flange joint typically used in the art.

A first aspect of the present invention may provide:
A casing assembly having:
a first casing part;
a second casing part;
wherein the first casing part is joined to the second casing part by a fixation device that includes:
a barrel nut inserted into a hole in the first casing part such that a hole in the barrel nut extends in a direction that is transverse to the direction of insertion of the barrel nut into the hole;
a bolt which extends into the first casing part, into the hole in the barrel nut, and into the second casing part, wherein the bolt engages with the barrel nut so as to join the first casing part to the second casing part;
wherein the barrel nut includes a first portion and a second portion, wherein the first portion of the barrel nut is structurally weaker than the second portion of the barrel nut such that, if a predetermined load between the first casing part and the second casing part is exceeded, the first portion of the barrel nut becomes crushed whilst the second portion of the barrel nut remains engaged with the bolt.

Advantageously, the inventors have found that a barrel nut configured in this way provides for bolt movement within the joint provided by the fixation device if the predetermined load is exceeded. This allows for greater relative movement between the first and second casing parts prior to total failure of the fixation device in the event that such a load occurs. The barrel nut therefore helps to inhibit total failure of the joint in the event of substantial load between the casing parts, e.g. as might be caused by a containment impact event.

A containment impact event may be understood as an event in which a blade of a gas turbine is released. Typically, the released blade centre of gravity is moving tangentially to a circle described by the centre of gravity in a rotating blade set. As it is released, the blade angular momentum causes a rotation in blade, and the resulting impacts of the blade with the casing assembly transfers radial, axial, and circumferential tangential impact load components into the casing As the first portion of the barrel nut is structurally weaker than the second portion of the barrel nut, the first portion of the barrel nut may be referred to or designated as "crushable".

The hole in the barrel nut may sometimes be referred to as a "bolt hole" herein.

The predetermined load noted above can be viewed as a load between the casing parts at which the first portion of the barrel nut is configured to become crushed. This load may be caused by an impact event, for example. This load is preferably high enough so that the first portion of the barrel nut does not become crushed under normal operating conditions (e.g. under the load applied by the bolt, which may be chosen to be commensurate with the strength of the casing parts), but does become crushed before the casing parts and/or bolt become crushed.

Preferably, the first portion of the barrel nut is on a side of the barrel nut that is closer to the interface between the first casing part and the second casing part than the second portion of the barrel nut. This helps provide for movement of the first and second casing parts away from each other, since it can be desirable to accommodate such movement should a containment impact event occur.

Preferably, the first portion of the barrel nut is configured to not engage with a thread on the bolt when the first casing part is joined to the second casing part by the fixation device. For example, the first portion of the barrel nut could lack an internal thread and/or be oversized with respect to (i.e. have a larger internal diameter than) the bolt.

Note that if the first portion of the barrel nut was configured to engage with a thread on the bolt when the first casing part is joined to the second casing part by the fixation device, then this engagement might inhibit the first portion of the barrel nut from becoming crushed if the predetermined load between the casing parts is exceeded, thereby reducing the reliability of the device.

Preferably, the second portion of the barrel nut has an internal thread that is configured to engage with a corresponding thread on the bolt when the first casing part is joined to the second casing part by the fixation device. In this way, the bolt can remain engaged with the second portion of the barrel nut after the first portion of the barrel nut becomes crushed. This helps to avoid total failure of the fixing device after an impact event.

The first portion of the barrel nut may be structurally weaker than the second portion of the barrel nut by means of the first portion of the barrel nut: including a plurality of holes; including a plurality of rods of a material that is structurally weaker than the material from which the second portion of the barrel nut is made; or being made of a material that is structurally weaker than the material from which the second portion of the barrel nut is made (e.g. glass fibre).

A second aspect of the present invention may provide:
A casing assembly having:
a first casing part;
a second casing part;
wherein the first casing part is joined to the second casing part by a fixation device that includes:
  a first barrel nut inserted into a hole in the first casing part such that a hole in the first barrel nut extends in a direction that is transverse to the direction of insertion of the first barrel nut into the hole;
  a second barrel nut inserted into a hole in the second casing part such that a hole in the second barrel nut extends in a direction that is transverse to the direction of insertion of the second barrel nut into the hole;
  a bolt which extends into the first casing part, into the hole in the first barrel nut, into the second casing part and into the hole in the second barrel nut, wherein the bolt engages with the first and second barrel nuts so as to join the first casing part to the second casing part.

In this way, both the first and second casing parts can avoid having a flange at the interface between the first casing part and the second casing part which can be advantageous for reasons discussed below with reference to FIG. 2 and FIG. 3.

Preferably, both the first and second casing parts do not have a flange at the interface between the first casing part and the second casing part.

A "flange" on a casing part may be understood herein as a portion of the casing part which projects out at an angle from the remainder of the casing part, e.g. for purposes of attachment.

Preferably, the bolt includes a first threaded portion configured to engage with a corresponding thread on the hole in the first barrel nut and a second threaded portion configured to engage with a corresponding thread on the hole in the second barrel nut.

Preferably, the first threaded portion and the second threaded portion turn in opposite directions from each other. For example, the first threaded portion may include a right hand thread with the second threaded portion including a left hand thread (or vice versa).

In this way, the bolt can be screwed into the first and second barrel nuts by turning the bolt in a single direction.

The bolt may include a torque hole configured to receive a lever, e.g. a "tommy" bar, which could be used to tighten the bolt.

The first casing part and/or second casing part are preferably configured to provide a slot in the casing assembly when joined together, to allow the torque hole to receive the lever.

A third aspect of the present invention may provide:
A casing assembly having:
a first casing part;
a second casing part;
wherein the first casing part is joined to the second casing part by a fixation device that includes:
  a barrel nut inserted into a hole in the first casing part such that a hole in the barrel nut extends in a direction that is transverse to the direction of insertion of the barrel nut into the hole;
  a bolt which extends into the first casing part, into the hole in the barrel nut, and into the second casing part, wherein the bolt engages with the barrel nut so as to join the first casing part to the second casing part.

This casing assembly and/or fixing device of this casing may optionally have any of the features described herein.

A fourth aspect of the present invention may provide:
A gas turbine engine including a casing assembly according to any previous aspect of the invention.

The casing assembly of the gas turbine engine may, for example, enclose fan blades of the gas turbine engine.

A fifth aspect of the present invention may provide:
a fixation device configured for joining a first casing part to a second casing part as described above.

In any aspect of the present invention, the casing assembly may form part of an enclosure for enclosing fluids at a pressure substantially different from ambient pressure. By way of example, the casing assembly could be a fan casing assembly, in which case the casing assembly may form part of an enclosure for enclosing fluids at around twice ambient pressure. However, the casing assembly could equally be for enclosing an engine core. Also, there is no reason why two casing parts from a hydraulic actuator could not be connected in a similar way and so, if sized right, it is thought that a set of barrel nuts could be used hold pressured casing parts together up to 5000 psi, possibly higher.

By way of example, the casing assembly could form part of a gas turbine engine, a containment casing (a fan casing assembly can be referred to as a containment casing as it can contain lost blades), a pressure vessel (such as a hydraulic actuator for controlling e.g. vanes on a gas turbine engine or a bucket on a JCB excavator, or such as industrial chemical reactor/storage tanks) or a blast containment enclosure, which are all enclosures that are suitable for enclosing fluids at a pressure substantially different from ambient pressure.

In any aspect of the present invention, the casing assembly preferably forms part of a gas turbine engine.

In any aspect of the present invention, a barrel nut is preferably configured for withstanding loads that are much greater than the barrel nuts typically found in flat pack furniture and, as such, will generally be made of materials (e.g. metal(s)), be thermally treated and manufactured to have the requisite strength needed for the applications described herein.

In any aspect of the present invention, the (or each) barrel nut may be configured for use in a gas turbine engine.

In any aspect of the present invention, the casing assembly may incorporate location and retention devices/features so that when assembled the barrel nut is held in the right orientation to accept the bolt and will not fall out when the bolt is removed.

In any aspect of the present invention, the barrel nut may have a locking feature to prevent the bolt from rotating under operation and coming loose. This could comprise a deformed thread which creates friction to prevent undoing. There are other methods of locking but the barrel nut/flange joint/bolt system preferably incorporates locking in some fashion.

In any aspect of the present invention, the first casing part preferably does not include a flange at the interface between the first casing part and the second casing part. The need for a flange in the first casing part (at the interface between the first casing part and the second casing part) can be avoided because the barrel nut is inserted in the hole in the first casing part. Not having a flange at the interface between the first casing part and the second casing part can be advantageous for reasons discussed below with reference to FIG. 2 and FIG. 3.

In any aspect of the present invention, the second casing part may include a flange at the interface between the first casing part and the second casing part, wherein the bolt extends through the flange of the second casing part (rather than merely extending into the second casing part). However, this feature is optional since, as discussed above in relation to the second aspect of the invention, the second casing part need not include a flange.

In any aspect of the present invention, the second casing part may include a flange at the interface between the first casing part and the second casing part whilst the first casing part does not include a flange at the interface between the first casing part and the second casing part. In this case, the first casing part is preferably stepped radially outwards of the second casing part. This may be useful to accommodate a liner, e.g. an acoustic liner, within the first casing part.

In any aspect of the present invention, the first casing part and/or second casing part is/are preferably made of composite. Herein, the term "composite" is intended to refer to a composite material comprising layers of fibres held in a resin matrix. In general, the fibres are generally carefully oriented within the resin matrix. Various processes are available to bring the fibres and resins together. The fibres are typically glass or carbon, though other materials are possible. The resin is typically epoxy or BMI, though other materials are possible.

An advantage of using composite for the first and/or second casing parts is that it is generally lighter and costs less than using metal for these parts. Composite is also stiff, strong and durable. The inventor(s) have observed that, for a composite casing, it is difficult to make an upturned flange. However, as noted above, the need for an upturned flange on either/both of the first and/or second casing parts can be alleviated by the present invention.

In any aspect of the present invention, a barrel nut may be configured to plug the hole into which it is inserted, i.e. so that it can be referred to as a "full occupancy" barrel nut.

In any aspect of the present invention, a thread on a bolt may engage with a thread on a barrel nut so as to join a first casing part to a second casing part.

In any aspect of the present invention, a barrel nut may include a location feature on an end of the barrel nut that is configured to allow a bolt fitter to turn the barrel nut whilst it is inserted in a hole in a casing part.

In any aspect of the present invention, a barrel nut may include a hole that has a lead-in chamfer to help a thread on the bold engage with a corresponding thread in the hole of the barrel nut.

In any aspect of the present invention, a barrel nut may include a thread configured to create a corresponding thread in a casing part as it is driven into a hole in the casing part.

In any aspect of the present invention, a barrel nut may have a torque carrying feature enabling it to be screwed into place in a hole in a casing part.

In any aspect of the present invention, a hole in a casing part may include a bush that is bonded into a hole in which a barrel nut is inserted. The bush is preferably crushable.

In any aspect of the present invention, a barrel nut may a top hat barrel nut that includes a brim at a head of the barrel nut.

In any aspect of the present invention, a barrel nut could include one or more locating features for orienting the barrel nut in a hole in a casing part.

In any aspect of the present invention, a bolt may extend partially into or fully through a hole in a barrel nut (a bolt extending fully through the barrel nut is preferred). A hole in a barrel nut is preferably a through-hole, but it would be possible for a barrel nut to extend only partially into a hole in a barrel nut.

In any aspect of the invention, a bolt may extend partially into or fully through a casing part. In general, where a bolt extends into a barrel nut inserted into a hole in a casing part, the bolt preferably extends only into the casing part. On the other hand, where a bolt extends into a casing part without passing into a barrel nut, the bolt preferably extends through a flange of the casing part, e.g. so that a nut can be added to a part of the bolt that projects out from the flange of the casing part.

In any aspect of the present invention, a hole in a casing part (into which a barrel nut may be inserted) may be a through-hole, or may be partially drilled into the casing part (i.e. such that the hole is not a through-hole).

In any aspect of the present invention, the first casing part may be joined to the second casing part by a plurality of the fixation devices. Each fixation device may include:
  a (respective) barrel nut inserted into a (respective) hole in the first casing part such that a (respective) hole in the barrel nut extends in a direction that is transverse to the direction of insertion of the barrel nut into the hole;
  a (respective) bolt which extends into the first casing part, into the hole in the barrel nut, and into the second casing part, wherein the bolt engages with the barrel nut so as to join the first casing part to the second casing part.

The invention also includes any combination of the aspects and preferred features described except where such a combination is clearly impermissible or expressly avoided. Preferred features described below may also be combined with any of the aspects described herein.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

In general, the following discussion describes examples of our proposals that provide various designs for joining a first casing part to a second casing part using a fixing device that includes a barrel nut, some of which allow specific types of motion in the interface between the two casing parts, as well as modifications to the casing geometry near the interface between the casing parts.

In some embodiments, the invention may relate to an insight by the inventors to combine the use of barrel nuts with crushable materials.

Figure 1:
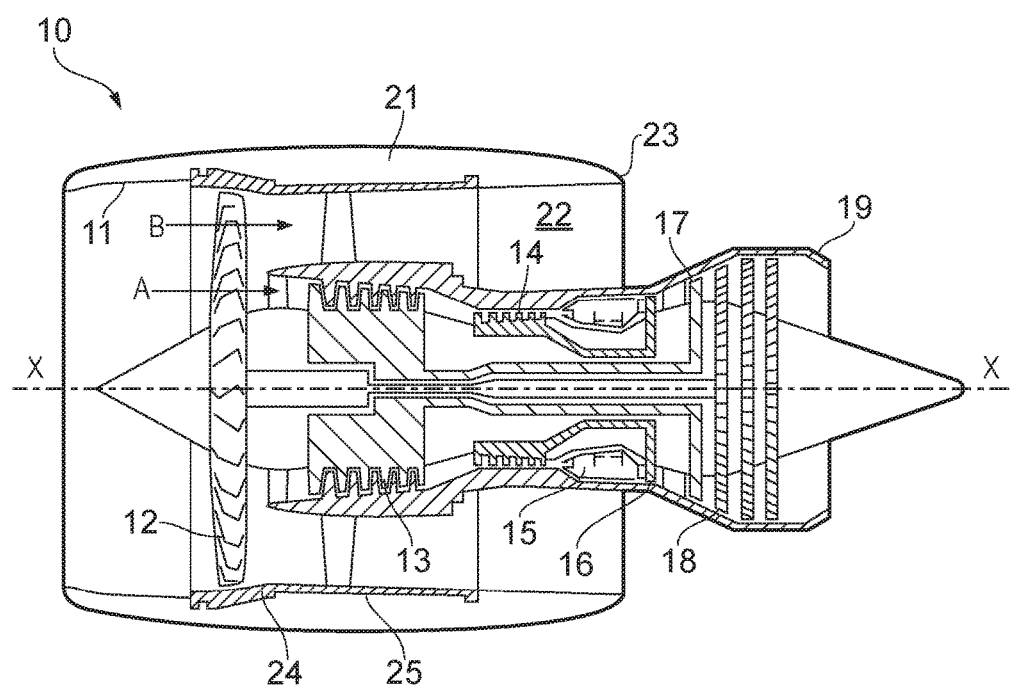
FIG. 1 shows a ducted fan gas turbine engine.

With reference to FIG. 1, a ducted fan gas turbine engine is generally indicated at 10 and has a principal and rotational axis X-X. The engine comprises, in axial flow series, an air intake casing part 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 (an outer casing part) generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

A fan casing part 24 surrounds the fan 12, and is typically joined at its rear end to a rear casing part 25, and at its front end to the air intake casing part 11.

Figure 2:
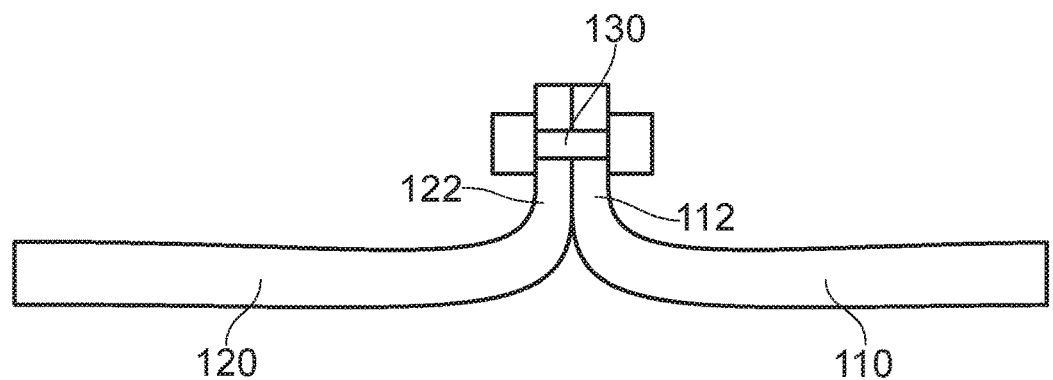
FIG. 2 and FIG. 3 show a first casing part 110 joined to a second casing part 120 by a fixation device typically used in the art.
Figure 3:
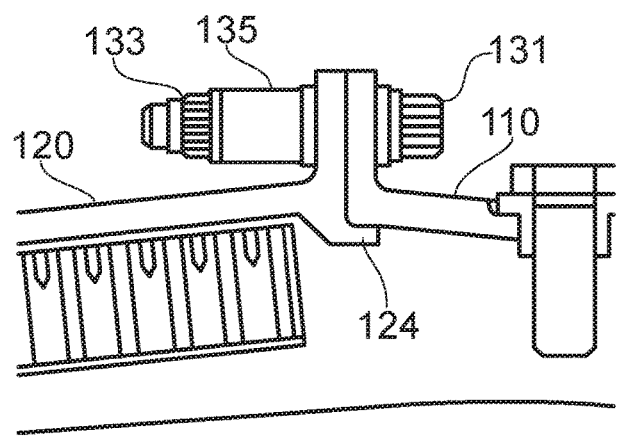

FIG. 2 and FIG. 3 show a first casing part 110 joined to a second casing part 120 by a fixation device typically used in the art.

As shown in these figures, the current art is to join a first casing part 110 to a second casing part 120 through an upturned bolted flange.

Herein, the first casing part 110 and the second casing part 120 may, for example, be the casing parts 24, 25 or the casing parts 11, 24 referred to above.

Thus, as shown in FIG. 2 and FIG. 3, the first casing part 110 includes a flange 112 and the second casing part 120 includes a flange 122, with a fixation device that includes a bolt 132 extending through the flanges 112, 122.

The joint shown in FIG. 2 and FIG. 3 is well suited to metallic casing parts, as the metal can easily be formed to create the upturned flanges 112, 120 and the upturned flanges 112, 122 are of metal that is as stiff and strong as the material of the remainder of the casing parts 110, 120.

For flanged joints subject to high deformations under limiting loads (e.g. containment casing flanges), there are some further design details of the bolt and washer design, as shown in FIG. 3.

Existing large civil turbofan flanges (e.g. fan case to air intake) are frequently held together with bolts (the bolt head 131 and the nut 133 can be seen in FIG. 3).

A spigot 124 on the second casing part 122 helps prevent radial slip between the first and second casing parts 110, 120.

Where the flanges 112, 122 is to be designed to endure severe dynamic loading, it is customary to extend the bolt by including a cylindrical collar or spacer 135 around the bolt shank and between either the bolt head 131 or nut 133 and one of the flanges 122, 122. This has the effect of increasing the effective length of the bolt 132 and therefore the absolute axial extension (i.e. stretching of the bolt) permissible prior to bolt failure.

An additional feature of the system is that the collar/spacer 135 may be made crushable such that at extreme loads permanent collar distortion occurs and much greater parting of the flanges becomes possible without failure of the bolt.

Some disadvantages of the joints shown in FIG. 2 and FIG. 3 are as follows:

(a) An upturned flange presents an increase in diameter compared with the diameter of the remainder of the casing parts. Where machine diameter is an issue, the machine diameter can be reduced by using a smaller diameter flange, with thicker section and/or a larger number of smaller bolts. In more extreme circumstances, the flange could be "downturned" (turned radially inwards of the casing), but this presents assembly difficulties, and operational difficulties. For aero gas turbine engines, the outer diameter of the nacelle is linked directly to the drag and efficiency of the engine, so this is minimised if the upturned flanges are omitted. Other constraints on diameter include shipping of large casings, fan case modules, or complete engines—all of which need to fit within the standard shipping constraints.

(b) An upturned (or downturned) flange, through its geometry, presents a "hoop" stiffness to the joined casing parts. Under shock loading or large deflections, stresses concentrate at the stiffer regions, so such a flange will attract high stresses. Under impact, high stiffness components generally see a shorter impact duration and higher stresses than a similar but less stiff component. In flange design, it may be preferable to reduce such stiffness, to allow a containment impact event to have a longer duration, to reduce the stress peaks.

(c) Although an upturned flange can easily be manufactured for a casing made from metal, for a casing made from composite material, the method of manufacture for an upturned flange is not straight forward, and maintaining consistent material properties around the flange corner region is difficult.

(d) Bolted flange loading is also difficult with composites because the through-thickness loading onto the composite under the bolt head and nut is high. Traditionally, that is solved using load spreaders, for example larger and specially shaped washers.

(e) In a containment impact event, the released blade centre of gravity is moving tangentially to the circle described by the centre of gravity in the rotating blade set. As it is released, the blade angular momentum causes a rotation in blade, and the resulting impacts of the blade with the casing assembly transfers radial, axial, and circumferential tangential impact load components into the casing. The blade crushes and tumbles so there are multiple force peaks and locations, each with a different combination of load components. The point is that flange joints are usually designed for axial loading, which put the bolts into tension or compression. Radial impact loads at a distance from the flange will create bending, and the main effect would be flange opening loads. The circumferential loads would tend to twist the impacted casing relative to the flange joint, imparting considerable shear to the bolts.

(f) A key issue is that after a containment impact event, bolts which have seen particularly high stresses will have deformed such that the flange joint would no longer be tight. This would generally mean a row of several bolts—a fair sector of the flange—would be loose, and potentially become hazardous following engine shut down and fly home. In such circumstances, the wind load on the remaining blades would cause the engine to continue to rotate at low frequency, and a flange that gapes under such frequencies could lead to fatigue failures around the casing flange, or in the neighbouring bolts—leading potentially to complete loss of the casing assembly.

In embodiments of the present invention, a first casing part is joined to a second casing part by a fixation device that includes a "barrel nut", which may help to reduce the size of and/or avoid the need for flanges by embedding the barrel nut in the main structure of the casing. Also, by using a barrel nut, the distance between the bolt head and the barrel nut can be chosen as needed, so there is no need for the crushable spacer 135. Thus, by using a barrel nut, many of the above mentioned problems can be overcome.

Basic Barrel Nut Implementation

Figure 4:
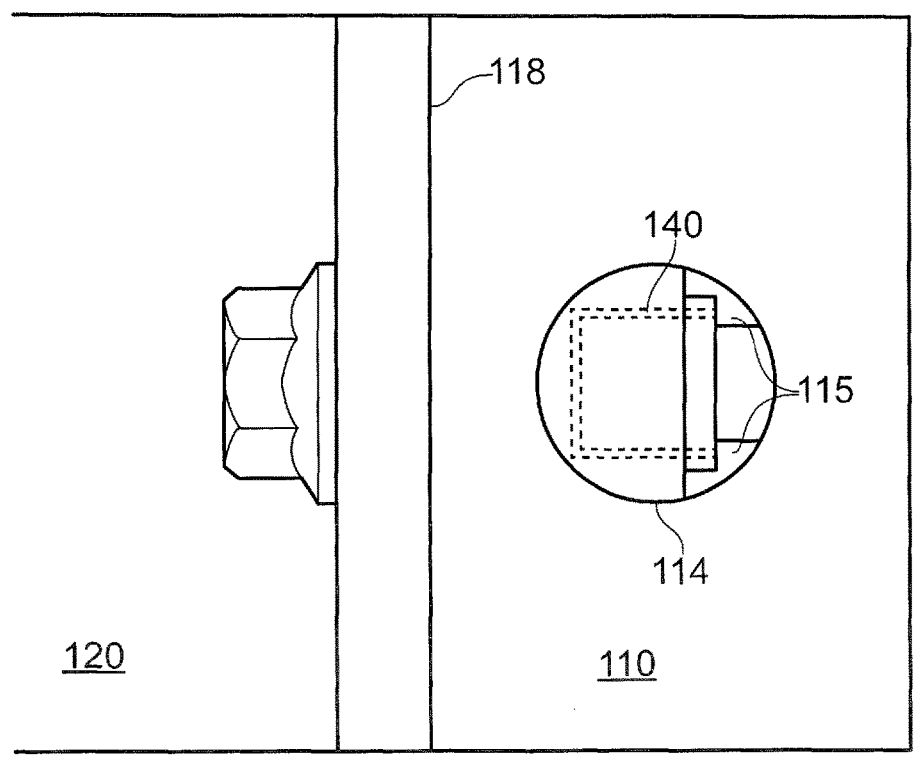
FIG. 4 and FIG. 5 show a joint assembly including a first casing part 110 joined to a second casing part 120 by a fixation device including a barrel nut 140.
Figure 5:
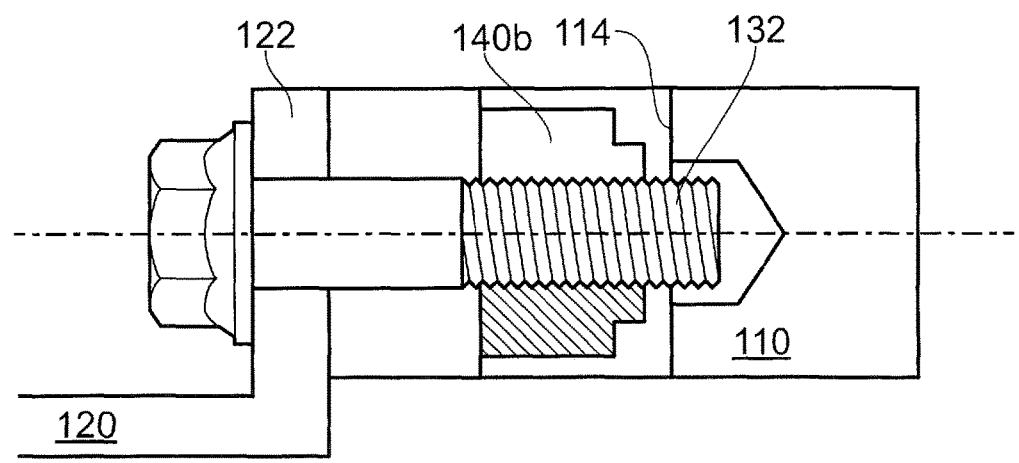

FIG. 4 and FIG. 5 show a joint assembly including a first casing part 110 joined to a second casing part 120 by a fixation device including a barrel nut 140.

In FIG. 4, the view of the joint is looking radially inwards towards the centre of the casing parts 110, 120.

In FIG. 5, the view is a cross-sectional, looking circumferentially around the centre of the casing parts 110, 120.

As shown in FIG. 4 and FIG. 5, the first casing part is joined to the second casing part by a fixation device that includes:

a barrel nut 140 inserted into a through-hole 114 in the first casing part 110 such that a through-hole in the barrel nut 140 extends in a direction that is transverse to the direction of insertion of the barrel nut 140 into the through-hole 114;

a bolt 132 which extends into the first casing part 110, through the through-hole of the barrel nut 140 and through a flange 122 of the second casing part 120, wherein (a thread on) the bolt 132 engages with (a corresponding thread on) the barrel nut 140 so as to join the first casing part 110 to the second casing part 120.

The hole 114 in the first casing part 110 is shown as a through-hole, but a partially drilled hole is also possible.

The barrel nut 140 inserted/embedded/installed in the first casing part 110 can in FIG. 4 be seen through the hole 114 in the first casing part 110, as can the interface 118 between the first casing part 110 and the (upturned flange 122 of the) second casing part 120.

The barrel nut 140 shown in FIG. 4 and FIG. 5 is not "full occupancy" (see below), so unblocked areas 115 of the hole 114 in the first casing part 110 can also be seen in FIG. 4.

The upturned flange 122 of the second casing part 120 can most clearly be seen in FIG. 5.

Standard ("off the shelf") aerospace barrel nuts are, as shown in FIG. 4 and FIG. 5, approximately semi-circular, and when fitted into the hole, do not fill it completely (see e.g. FIG. 4 which shows the unblocked areas 115 in the hole 114 in the first casing part 110). This can be an issue if the casing has to be leak proof, for example for fire prevention, and could therefore cause the casing assembly to fail fire requirements.

Other issues to be considered in implementing a fixation device including a barrel nut 140 include the ease of fit and adjustment, how frequently the flange 122 needs to be opened in service and re-joined, how precise the alignment needs to be, and how simple the joint assembly should be.

Optional Modifications to the Basic Barrel Nut Implementation

Figure 6:
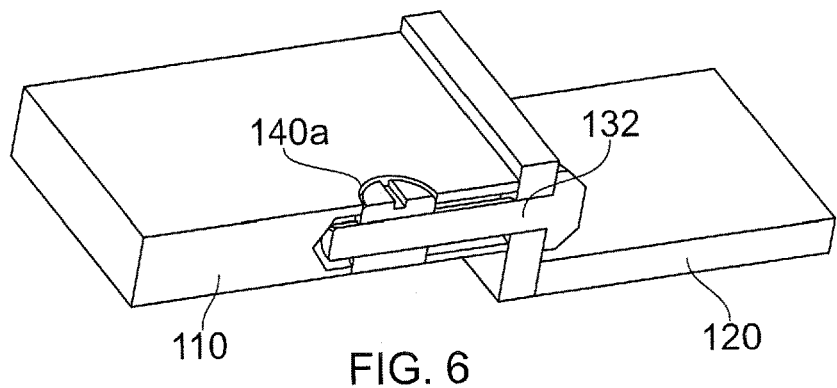
FIG. 6 shows a joint assembly including a first casing part 110 joined to a second casing part 120 by a fixation device including a barrel nut 140a, where the barrel nut is a "full occupancy" barrel nut.

FIG. 6 shows a joint assembly including a first casing part 110 joined to a second casing part 120 by a fixation device including a barrel nut 140*a*, where the barrel nut is a "full occupancy" barrel nut.

In this case, the barrel nut 140*a* may take the general shape of a barrel nut that may be used in flat pack (self-assembly) furniture. A circular hole 114 may be machined through the full thickness of the first casing part 110, and the barrel nut 140*a* may be a cylinder which fully occupies the hole 114 by being a snug fit in the hole, i.e. such that the barrel nut 140*a* plugs the hole and can therefore be referred to as a "full occupancy" barrel nut. The barrel nut 140 preferably has a through-hole cut through it, transverse to the direction of insertion of the barrel nut 140 into the hole 114, which takes the bolt. The through-hole in the barrel nut 140a preferably includes a thread configured to engage with a corresponding thread on the bolt 132.

To accommodate the bolt 132, a hole is preferably machined through the end of the first casing part 110, and passes into (and preferably through) the hole in the barrel nut 140a. This bolt 132 is preferably a loose fit into the hole in the first casing part 110, and screws into the barrel nut 140a. For best grip, the bolt preferably screws completely through the barrel nut with excess to ensure good adjustability.

Optionally, the barrel nut 140a may have a location feature on an end of the barrel nut 140a that is accessible post-installation, which preferably is configured to allow a bolt fitter to turn the barrel nut 140a to align the hole in the barrel nut 140a with the bolt 132. Thus, the barrel nut 140a is preferably adjustable by a bolt fitter.

Optionally, the location feature may include a loop, ledge or grip feature to allow it to be pulled out using a screwdriver blade, pliers or another simple tool. Optionally, the location feature may be magnetic or able to be attracted by a magnet, and may be configured to be pulled out using magnetic force.

Optionally, the hole in the barrel nut 140a may have a lead-in chamfer to help the bolt thread to engage with the nut thread grooves in the hole. Optionally, a tip of the bolt 132 may be tapered, for the same purpose.

Note that the first casing part 110 is stepped radially outwards of the second casing part 120. This may be useful to accommodate a liner (not shown), e.g. an acoustic liner, within the first casing part 110. The acoustic liner may form a continuous surface with the radially inwards surface of the second casing part 120.

Any tolerance issues in the alignment of the two casing parts 110, 120 at the interface between the casing parts 110, 120 can be taken care of by a loose fit of the bolt 132 in its entry hole in the first casing part 110. Alternatively, the barrel nut 140a can be a little smaller/shorter than the thickness of the first casing part 110, which would be enough to avoid it sitting proud on the inner or outer surface post-adjustment.

In practice, it is envisaged that a plurality of fixation devices would be used to join the first casing part 110 to the second casing part. The number of fixation devices, and the design of the barrel nut 140a would need to be taken into consideration, as would considerations relating to stress— i.e. for the ability of the casing assembly to retain roundness during normal duty.

Probably the most challenging design aspect for casing assemblies for gas turbine engines is impact worthiness, i.e. the ability to withstand a containment impact event as described above, as it is this aspect that sizes the containment casing, whilst other considerations such as the number of fixation devices, and flange design, will often be determined after impact worthiness is demonstrated, and it is believed that a barrel nut design as shown in FIG. 4 onwards could be a useful contributor to impact worthiness.

Because it is "full occupancy", the barrel nut 140a of FIG. 6 helps ensure that the casing assembly is fire proof (a problem with the barrel nut of FIG. 4 and FIG. 5). However, in this example, the barrel nut 140a is only locked in place in the hole in the first casing part 110 by the bolt 132 and would fall through the hole in the first casing part 110 if the bolt 132 were not present.

Figure 7:
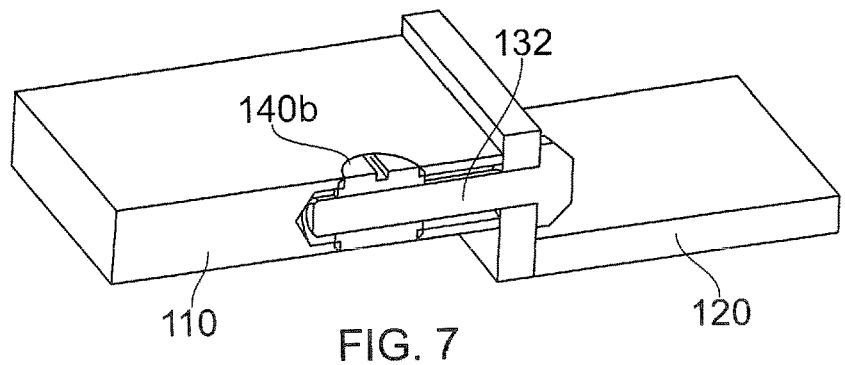
FIG. 7 shows a joint assembly including a first casing part 110 joined to a second casing part 120 by a fixation device including a barrel nut 140b, where the barrel nut 140b is a "full occupancy" barrel nut that includes a screw thread configured to allow the barrel nut 140b to be screwed into the hole in the first casing part 110.

FIG. 7 shows a joint assembly including a first casing part 110 joined to a second casing part 120 by a fixation device including a barrel nut 140b, where the barrel nut 140b is a "full occupancy" barrel nut that includes a screw thread configured to allow the barrel nut 140b to be screwed into the hole in the first casing part 110.

Because it is "full occupancy", the barrel nut 140b of FIG. 7 helps ensure that the casing assembly is fire proof.

Preferably, the screw thread on the barrel nut 140b is self-tapping, i.e. so that it creates a corresponding thread in the first casing part 110 as it is driven into the hole in the first casing part 110. As before, the barrel nut 140b is preferably adjustable by a bolt fitter.

The first casing part 110 may be of composite material.

In this example, the top of the barrel nut 140b may have a torque carrying feature, e.g. a slot or cross head, enabling it to be screwed into place in the hole in the first casing part 110. As noted above, the surface of the barrel nut 140b preferably includes a screw thread. The hole through the first casing part may be machined to the nominal size of the barrel nut 140b, which can then be aligned and self-tapped into the hole by the bolt fitter. The torque carrying feature (illustrated here as a slot) may double as a location/alignment feature, so that the bolt hole in the barrel nut can be aligned with the bolt 132.

As composite materials are generally relatively weak in the through-thickness direction, self-tapping a screw thread in a first casing part 110 made of composite would not require great force.

The radial location of the bolt hole in the barrel nut 140b could be fixed to the nearest increment of thread pitch. There may be sufficient slack in the bolt alignment, and the bolt hole in the neighbouring flange (i.e. flange 122 of the second casing part 120) to accommodate this.

The barrel nut joint of FIG. 7 could be easily opened by unscrewing the bolts 132, and the barrel nut(s) 140b would not need to be removed. This makes this design more convenient than those shown in FIG. 4, FIG. 5 and FIG. 6.

Frequent removal of the barrel nuts would generally be counter-indicated (meaning that assembly and disassembly can weaken the structure, so only a specific number of assemblies/disassemblies are permitted before service repair or replacement), since frequent removal would loosen up the material surrounding the thread, and potentially allow pull-out, or provide a site for delamination initiation.

A potential issue is that the thread cuts in the composite would present delamination initiation sites. Under normal casing loads, this should not be a problem, and could in fact be advantageous under impact loads. Initiating delamination at particular sites could be utilised to increase local casing flexibility and reduce peak impact loads.

Figure 8:
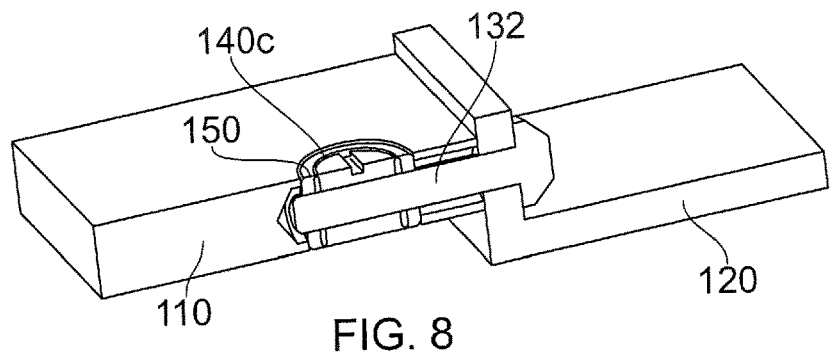
FIG. 8 shows a joint assembly including a first casing part 110 joined to a second casing part 120 by a fixation device including a barrel nut 140c, where the barrel nut 140c is a "full occupancy" barrel nut that includes a screw thread configured to allow the barrel nut 140c to be screwed into a bush bonded into the hole in the first casing part 110.

FIG. 8 shows a joint assembly including a first casing part 110 joined to a second casing part 120 by a fixation device including a barrel nut 140c, where the barrel nut 140c is a "full occupancy" barrel nut that includes a screw thread configured to allow the barrel nut 140c to be screwed into a bush bonded into the hole in the first casing part 110.

Because it is "full occupancy", the barrel nut 140c of FIG. 8 helps ensure that the casing assembly is fire proof In this example, the hole in the first casing part 110 is cut larger than the barrel nut 140c and is lined with a bush 150 that is bonded into the hole, e.g. with resin. This helps to solve the potential issue of thread cuts causing unwanted delamination in the hole in the first casing part 110.

As before, the first casing part 110 is preferably of composite.

As with the example of FIG. 7, the screw thread on the barrel nut 140c preferably allows the barrel nut 140c to be self-tapped into the bush 150. The screw thread on the barrel nut 140c would have to be provided in a controlled way to prevent delamination.

The barrel nut 140c is preferably also adjustable by a bolt fitter via a torque carrying feature.

The bush 150 is preferably crushable, thereby allowing an effective bolt extension/growth during an impact event.

Figure 9:
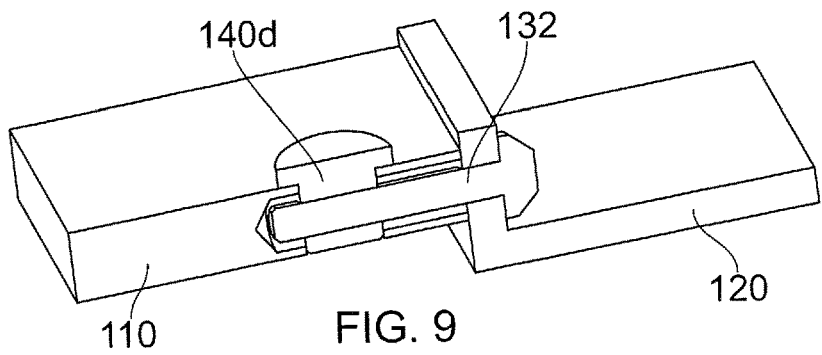
FIG. 9 shows a joint assembly including a first casing part 110 joined to a second casing part 120 by a fixation device including a barrel nut 140d, where the barrel nut 140d is a "full occupancy" top hat barrel nut.

FIG. 9 shows a joint assembly including a first casing part 110 joined to a second casing part 120 by a fixation device including a barrel nut 140d, where the barrel nut 140d is a "full occupancy" top hat barrel nut.

Because it is "full occupancy", the barrel nut 140d of FIG. 9 helps ensure that the casing assembly is fire proof If there is no issue with the barrel nut sitting proud of the casing surface, a top hat barrel nut 140d such as that shown in FIG. 8 may be appropriate. This would help to avoid the unwanted delamination issues of the self-tapping designs shown in FIG. 7 and FIG. 8, but would equally still have some of the fitting and re-fitting inconveniences of the design shown in FIG. 6.

The barrel nut 140d of FIG. 9 may sit on a spot-face or natural curvature and/or be sealed with poly-sulphide or other sealant for fire proofing.

The barrel nut 140d of FIG. 9 need not be threaded.

The barrel nut 140d could be self-located/oriented into the first casing part 110 by one or more locating features, such as grub screw or interference pin in the brim of the top hat (e.g. a pin in the top hat brim could fit into a corresponding hole in the first casing part 110).

A sealant (poly-sulphide or other) could provide improved fire proofing, and may also keep the nut located during the joining or re-joining of the first and second casing parts, thereby stopping the nut from falling out.

The option of a grub screw or pin could complicate the design, but overcome the issue of keeping the barrel nut in place during fitting or semi-permanently.

In an example not illustrated, the hole in the first casing part 110 (to take the barrel nut) may only be partially drilled, i.e. such that it is not a through-hole. The casing assembly is thus able to remain fire proof, without requiring a "full occupancy" barrel nut. Like the top hat barrel nut, the barrel nut can only fall out one way, which could help with fitting. However, clean blind holes are less easy to machine, and there could be depth variation from hole to hole.

Figure 10:
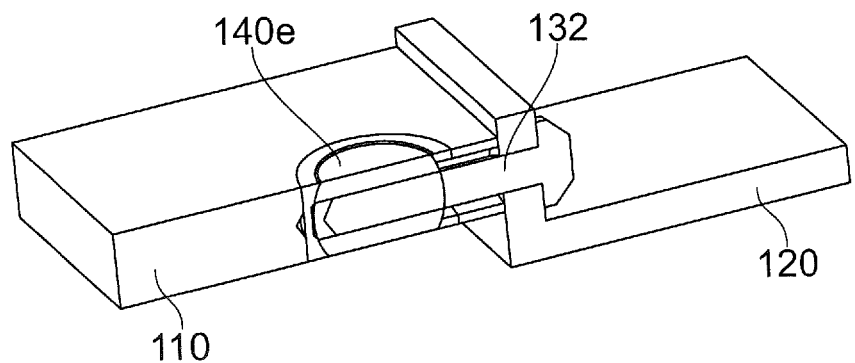
FIG. 10 shows a joint assembly including a first casing part 110 joined to a second casing part 120 by a fixation device including a barrel nut 140e, where the barrel nut 140e is a rounded barrel nut.

FIG. 10 shows a joint assembly including a first casing part 110 joined to a second casing part 120 by a fixation device including a barrel nut 140e, where the barrel nut 140e is a rounded barrel nut.

In this example, the barrel nut 140e is rounded, preferably spherical, and may be similar to a spherical bearing.

With the previously discussed barrel nuts, any rotation between the first and second casing parts 110, 120 would be prevented by the barrel nut turning in the hole in the first casing part 110 and the bolt 132 going into tension. However, this won't happen if the first and second casing parts 110, 120 slip radially inboard or outboard and therefore spigots will preferably be used to prevent radial movement (e.g. see FIG. 3). With any radial movement of the first and second casing parts 110, 120 a spherical barrel nut would inhibit such movement with bolts going into tension in all directions. It would also be possible to have a crushable washer under the bolt head to allow compliance under bending.

The rounded barrel nut of FIG. 10 therefore allows for some circumferential and radial motion of one casing relative to the other across the joint.

A variation on the design shown in FIG. 10 would be to ellipsoidal, rather than spherical, barrel nut shape. This will tend to stay firmly located under small scale loads, but will act as a spherical bearing, under sufficient loads to distort the composite around the relatively stiff ellipsoid nut, or if the nut is of relatively compressible or crushable material, the nut will distort in preference to the composite. The smooth curvature of the ellipsoid will enable a smooth orientation transition and avoid shock loads.

Another variation on the design shown in FIG. 10 would be to have a hemispherical boss under the bolt head, or a hemispherical back to the bolt head, in order to allow the bolt head to swivel smoothly on the other casing flange.

As regards fitting the rounded barrel nut 140e into its bearing, FIG. 10 shows that the region into which the spherical nut is inserted is surrounded by a cylindrical region, which is an insert that is effectively a bearing ball joint. The first casing part 110 is drilled, and the nut and bearing inserted. The bolt is then screwed in from the side. In the case that no cylindrical insert were used, the barrel nut could, for example, be built into the casing preform during composite lay-up and be captive.

Semi-Threaded Semi-Crushable Barrel Nut

Figure 11:
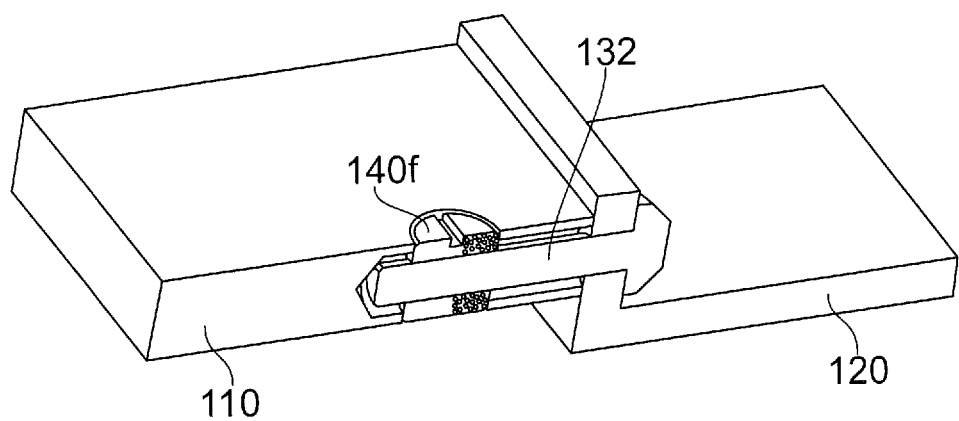
FIG. 11 shows a joint assembly including a first casing part 110 joined to a second casing part 120 by a fixation device including a barrel nut 140f, where the barrel nut 140f is a "full occupancy" hat barrel nut that is semi-threaded and semi-crushable.

FIG. 11 shows a joint assembly including a first casing part 110 joined to a second casing part 120 by a fixation device including a barrel nut 140f, where the barrel nut 140f is a "full occupancy" hat barrel nut that is semi-threaded and semi-crushable.

Figure 12:
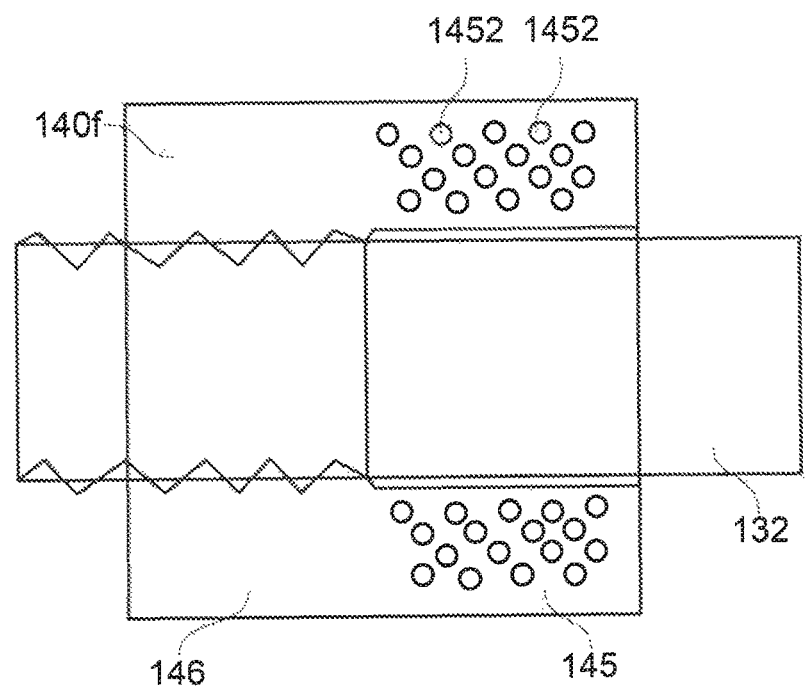
FIG. 12 shows (in sectional view) the barrel nut 140f of FIG. 11 in more detail.

FIG. 12 shows (in sectional view) the barrel nut 140f of FIG. 11 in more detail.

Because it is "full occupancy", the barrel nut 140f of FIG. 12 helps ensure that the casing assembly is fire proof.

Note that, as shown in FIG. 11, the bolt 132 extends into the first casing part 110, into (and indeed through) the hole in the barrel nut 140f, and into (indeed through) the second casing part 120, wherein the bolt engages with the barrel nut 140f so as to join the first casing part 110 to the second casing part 120.

In this example, advantage can be taken of the fact that the barrel nut 140f is a full cylinder and therefore "full occupancy". In detail, as shown in FIG. 12, a first portion (front half 145) of the barrel nut 140f includes a plurality of holes 1452, or a plurality of rods 1452 of a material that is structurally weaker than the material from which a second portion (back half 146) of the barrel nut is made. The first portion (front half 145) of the barrel nut 140f thereby is structurally weaker than the second portion of the barrel nut 140f and is therefore designated as being crushable.

The front half 145 of the barrel nut 140f, which is designated crushable, faces towards the interface between the first casing part 110 and the second casing part 120. The bolt hole in this front half 145 of the barrel nut 140f is over-size so the front half 145 of the barrel nut 140f does not engage with a thread on the bolt 132. The back half 146 of the barrel nut 140f is designated threaded (i.e. has an internal thread), and it is in this back half 146 of the barrel nut where the bolt 132 engages with the internal thread in the barrel nut 140f.

Under an impact load which exceeds a predetermined threshold, the bolt 132 remains engaged with the back half 146 of the barrel nut 140f, while the front half 145 of the barrel nut is allowed to crush. That is, the barrel nut 140f would partially crush under axial extension of the casing assembly before the bolt 132 would break. This provides for a bolt extension within the structure of the joint. In other words, by allowing the barrel nut to partially crush under these circumstances, greater relative movement between the first and second casing parts is permitted prior to total failure of the fixation device.

Note that the front half 145 of the barrel nut 140f is on a side of the barrel nut 140f that is closer to the interface between the first casing part 110 and the second casing part 120. This helps provide for movement of the first and second casing parts 110, 120 away from each other during a containment impact event as described above.

Double Barrel Nut Joint Assembly

It can be understood that the exact location of an interface between two casing parts can be varied, and it may be advantageous to move the joint line as far rearward of the impact zone as possible in order to minimise the stress concentrations that tend to locate around stiff regions in a structure subjected to impact.

Figure 13:
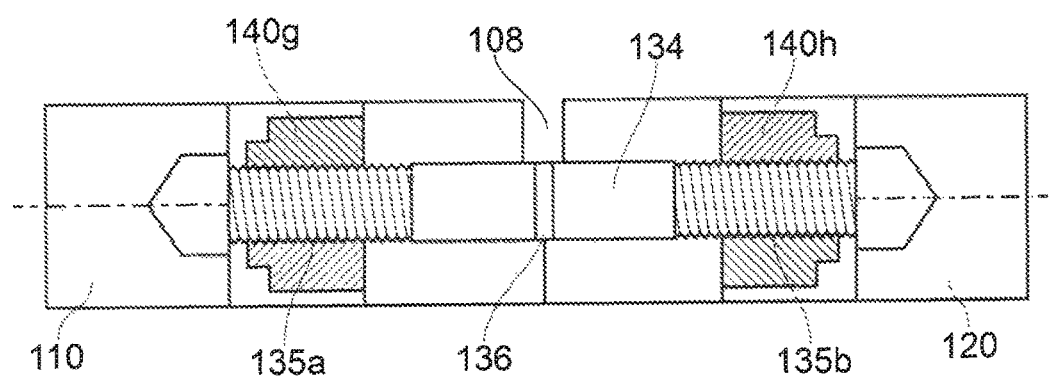
FIG. 13 shows a joint assembly including a first casing part 110 joined to a second casing part 120 by a fixation device including a first barrel nut 140g and a second barrel nut 140h.

FIG. 13 shows a joint assembly including a first casing part 110 joined to a second casing part 120 by a fixation device including a first barrel nut 140g and a second barrel nut 140h.

As noted above, an upturned flange creates a relatively stiff region, and therefore attracts stress concentrations in a containment impact event.

It may therefore be advantageous to avoid having any upturned flanges on both of the casings which meet at a joint.

In this example, this is achieved using a double threaded bolt 134, a first barrel nut 140g and a second barrel nut 140h. Although the illustrated barrel nuts 140g, 140h are similar to those illustrated in FIG. 4 and FIG. 5, the barrel nuts 140g, 140h are preferably full occupancy barrel nuts as described elsewhere herein.

In this example, one end of the bolt 134 is cut with a left hand thread 135a and the other end of the bolt 134 with a right hand thread 135b. Each end of the bolt 135 engages with a respective barrel nut 140g, 140h. Note that each barrel nut 140g, 140h must have an internal thread that corresponds to the thread on the bolt 134 to which the barrel nut engages, so in this specific example the barrel nut 140g would have a left hand thread configured to engage with the left hand thread of the bolt and the barrel nut 140h would have a right hand thread 135b configured to engage with the right hand thread of the bolt 134. The bolt 134 can be tightened using a lever (e.g. "tommy" bar) which passes through a hole 136 in the middle of the bolt 134 and a slot 108 in the casing assembly. A similar mechanism is used to tighten the framework to attach a chin rest to a violin.

The first casing part 110 and second casing part 120 are preferably configured to provide a slot 108 in the casing assembly when joined together, to allow the torque hole to receive the "tommy" bar.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, whilst the invention has mainly been described in connection with casings for use in gas turbine engines, the invention could be used for a containment casing, a casing of a pressure vessel or a casing for blast containment For the avoidance of any doubt, any theoretical explanations provided herein are provided for the purposes of improving the understanding of a reader. The inventors do not wish to be bound by any of these theoretical explanations.

All references referred to above are hereby incorporated by reference.

The invention claimed is:

1. A casing assembly having:
a first casing part; and
a second casing part, each of the first and second casing parts extending around an entire circumference of a gas turbine engine, wherein the first casing part is joined to the second casing part by a fixation device that includes:
a barrel nut inserted into a hole in the first casing part such that a hole in the barrel nut extends in a direction that is transverse to the direction of insertion of the barrel nut into the hole;
a bolt which extends into the first casing part, into the hole in the barrel nut, and into the second casing part, wherein the bolt engages with the barrel nut so as to join the first casing part to the second casing part;
wherein the barrel nut includes a first portion and a second portion, wherein the first portion of the barrel nut is structurally weaker than the second portion of the barrel nut such that, if a predetermined load between the first casing part and the second casing part is exceeded, the first portion of the barrel nut becomes crushed whilst the second portion of the barrel nut remains engaged with the bolt, and
wherein the first portion of the barrel nut is structurally weaker than the second portion of the barrel nut by means of the first portion of the barrel nut: including a plurality of holes; including a plurality of rods of a material that is structurally weaker than the material from which the second portion of the barrel nut is made; or being made of a material that is structurally weaker than the material from which the second portion of the barrel nut is made.

2. The casing assembly of claim 1, wherein the first portion of the barrel nut is on a side of the barrel nut that is closer to the interface between the first casing part and the second casing part than the second portion of the barrel nut.

3. The casing assembly of claim 1, wherein the first portion of the barrel nut is configured to not engage with a thread on the bolt when the first casing part is joined to the second casing part by the fixation device.

4. The casing assembly of claim 1, wherein the second portion of the barrel nut has an internal thread that is configured to engage with a corresponding thread on the bolt when the first casing part is joined to the second casing part by the fixation device.

5. A casing assembly according to claim 1, wherein the second casing part includes a flange at the interface between the first casing part and the second casing part whilst the first casing part does not include a flange at the interface between the first casing part and the second casing part.

6. A casing assembly according to claim 1, wherein the first casing part and/or second casing part is made of composite.

7. The casing assembly of claim 1, wherein the first portion of the barrel nut is structurally weaker than the second portion of the barrel nut by means of the first portion of the barrel nut including the plurality of holes.

8. The casing assembly of claim 1, wherein the first portion of the barrel nut is structurally weaker than the second portion of the barrel nut by means of the first portion of the barrel nut including the plurality of rods of the material that is structurally weaker than the material from which the second portion of the barrel nut is made.

9. A casing assembly having:
   a first casing part;
   a second casing part;
      wherein the first casing part is joined to the second casing part by a fixation device that includes:
      a barrel nut inserted into a hole in the first casing part such that a hole in the barrel nut extends in a direction that is transverse to the direction of insertion of the barrel nut into the hole;
      a bolt which extends into the first casing part, into the hole in the barrel nut, and into the second casing part, wherein the bolt engages with the barrel nut so as to join the first casing part to the second casing part;
      wherein the barrel nut includes a first portion and a second portion, wherein the first portion of the barrel nut is structurally weaker than the second portion of the barrel nut such that, if a predetermined load between the first casing part and the second casing part is exceeded, the first portion of the barrel nut becomes crushed whilst the second portion of the barrel nut remains engaged with the bolt, and
      wherein the first portion of the barrel nut is structurally weaker than the second portion of the barrel nut by means of the first portion of the barrel nut: including a plurality of holes; or including a plurality of rods of a material that is structurally weaker than the material from which the second portion of the barrel nut is made.

10. The casing assembly of claim 9, wherein the first portion of the barrel nut is structurally weaker than the second portion of the barrel nut by means of the first portion of the barrel nut including the plurality of holes.

11. The casing assembly of claim 9, wherein the first portion of the barrel nut is structurally weaker than the second portion of the barrel nut by means of the first portion of the barrel nut including the plurality of rods of the material that is structurally weaker than the material from which the second portion of the barrel nut is made.

12. The casing assembly of claim 9, incorporated in a gas turbine engine.

* * * * *